(12) United States Patent
Huang et al.

(10) Patent No.: US 7,676,755 B2
(45) Date of Patent: Mar. 9, 2010

(54) APPARATUS AND METHOD FOR LINKING OBJECTS CREATED IN A RAPID APPLICATION DEVELOPMENT ENVIRONMENT

(75) Inventors: Jin Huang, Mountain House, CA (US); Sung-Li Yang, San Ramon, CA (US); Anita P. Narra, Pleasanton, CA (US)

(73) Assignee: Business Objects Software Ltd., Dublin (IE)

( * ) Notice: Subject to any disclaimer, the term of this patent is extended or adjusted under 35 U.S.C. 154(b) by 272 days.

(21) Appl. No.: 11/697,595

(22) Filed: Apr. 6, 2007

(65) Prior Publication Data

US 2008/0250062 A1 Oct. 9, 2008

(51) Int. Cl.
G06F 3/00 (2006.01)
G06F 9/44 (2006.01)

(52) U.S. Cl. .................. 715/762; 715/763; 715/765; 715/777; 717/109

(58) Field of Classification Search .............. 715/744, 715/762–765, 777, 212, 967, 769; 717/100, 717/106, 108, 109
See application file for complete search history.

(56) References Cited

U.S. PATENT DOCUMENTS

2007/0276689 A1* 11/2007 Slone et al. .................. 705/1
2008/0077936 A1* 3/2008 Goel et al. .................. 719/312

* cited by examiner

*Primary Examiner*—X. L Bautista
(74) *Attorney, Agent, or Firm*—Cooley Godward Kronish LLP

(57) ABSTRACT

A computer readable storage medium includes executable instructions to invoke a rapid application development graphical user interface to define fields associated with a set of objects. The creation of new objects derived from the set of objects is facilitated using the rapid application development graphical user interface to select existing fields of the set of objects and define new object fields. Tabs are associated with the new objects. A set of tabs is selected to create a new application.

20 Claims, 13 Drawing Sheets

| | | | | | | |
|---|---|---|---|---|---|---|
| Attach File | Save | Route | Reset | Cancel | | Procedures |

602

☑ Job Requisitions : Details  310

ⓘ Requisition Information

316—Job ID:* E100  Title/Position:* Engineer  318
320—Location:* San Francisco, CA, USA  Pay Min:
EEO Job Type: Please Select —604  Pay Max:
Employment Type:* Part Time, Contract  Hiring Manager:* Pawan Nachnani
Department: Development  Target Fill Date:* 02/28/2006

312—ⓘ Function and Qualifications

314—ⓘ Comments and Attachments

ⓘ Audit Information

Edit Tab

Edit Tab  1002

Name:* Job Requisitors
1004 — Active: ☑
1006 — Visibility:
1008 — Type:* Enterprise Object    1010
Select Object: Job Requisitions (Mode:T, Version:1)
1012 — Image: [Select...]
1014 — Custom URL:

Submit   Reset   Cancel                Create New Tab
                                              1001

APPARATUS AND METHOD FOR LINKING OBJECTS CREATED IN A RAPID APPLICATION DEVELOPMENT ENVIRONMENT

BRIEF DESCRIPTION OF THE INVENTION

This invention relates generally to the creation of application software. More particularly, this invention relates to techniques for linking objects created in a rapid application development environment to produce new applications.

BACKGROUND OF THE INVENTION

Application software is a subclass of computer software that utilizes executable instructions to accomplish a task for an end user. In contrast, system software integrates a computer's capabilities, but typically does not directly apply the capabilities in the performance of a task for an end user. Typical examples of software applications are word processors, spreadsheets, media players and other software to perform more narrowly tailored tasks, such as a bug tracking application, a contact management application, a recruiting management application, a channel management application, a quote and proposal application, a project management application, and the like.

Rapid Application Development (RAD) is a software methodology to reduce the need for individuals to prepare complex code to implement an application. Typically, RAD involves iterative development, the construction of prototypes, and the use of Computer-Aided Software Engineering (CASE) tools. Some RAD software expresses rules in tables rather than sequential code, allowing non-programmers to quickly develop programs.

RAD techniques have been successfully used to allow users to customize an application. For example, the Nsite Quote and Channel Management product (Version 5.0), formerly sold by Nsite Software. Inc., includes 14 application templates to automate business applications, such as sales support, performance management contract review, and the like. Each template can be customized through a drag and drop interface without any coding to produce customized or new applications. Each customized or new application relies upon a set of objects associated with the original template. There is no sharing of objects between applications.

In view of the foregoing, it would be desirable to provide improved techniques for naming, connecting and deploying objects in a rapid application development environment. In particular, it would be desirable to utilize a simple graphical user interface feature (e.g., a tab) to process and deploy objects across applications and between multiple applications.

SUMMARY OF THE INVENTION

The invention includes a computer readable storage medium with executable instructions to invoke a rapid application development graphical user interface to define fields associated with a set of objects. The creation of new objects derived from the set of objects is facilitated using the rapid application development graphical user interface to select existing fields of the set of objects and define new object fields. Tabs are associated with the new objects. A set of tabs is selected to create a new application.

BRIEF DESCRIPTION OF THE FIGURES

The invention is more fully appreciated in connection with the following detailed description taken in conjunction with the accompanying drawings, in which:

FIG. 6 illustrates a GUI to display information about an object of FIG.

FIG. 10 illustrates a GUI to associate an object with a tab in accordance with an embodiment of the invention.

FIG. 12 illustrates a GUI to support role based access in accordance with an embodiment of the invention.

FIG. 13 illustrates a GUI to support the management of objects utilized in accordance with an embodiment of the invention.

Like reference numerals refer to corresponding parts throughout the several views of the drawings.

DETAILED DESCRIPTION OF THE INVENTION

Figure 1:
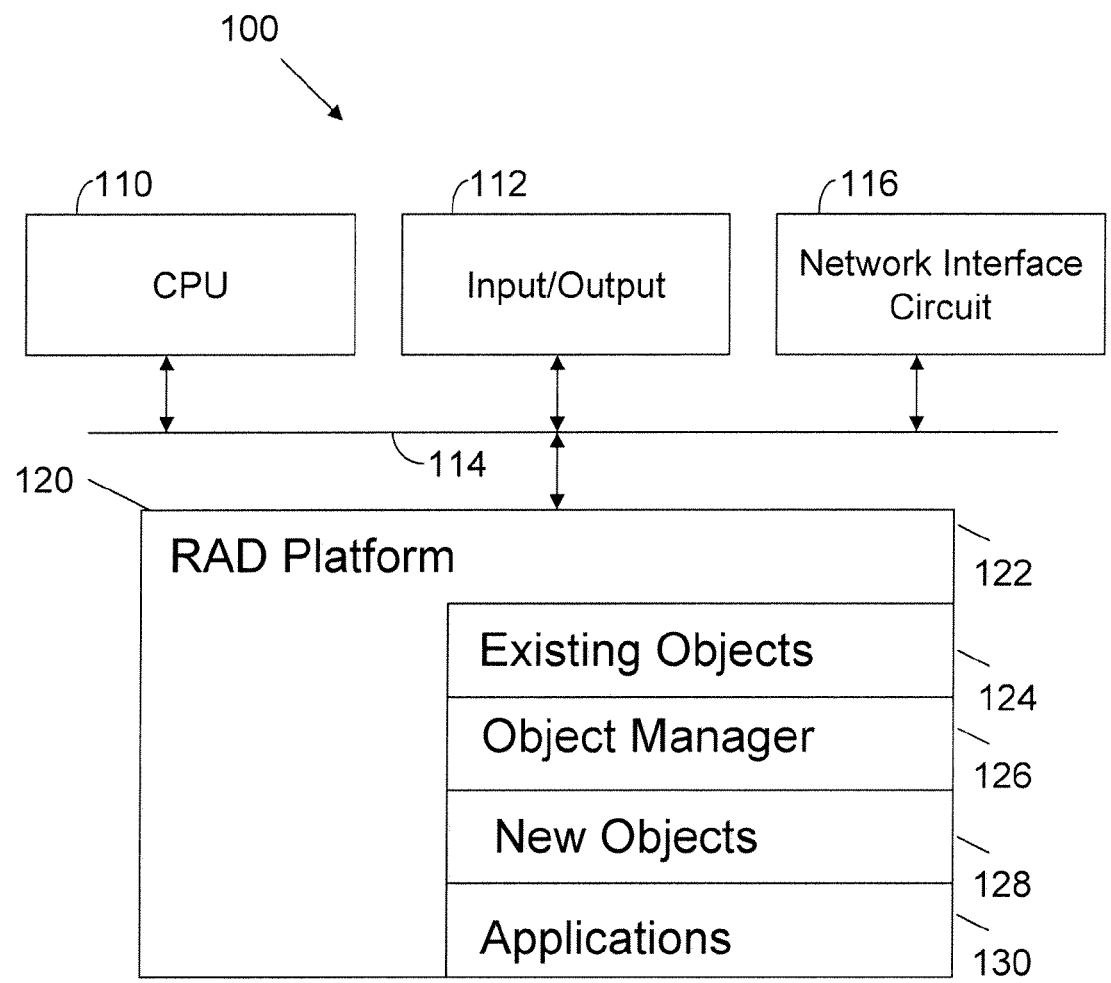
FIG. 1 illustrates a computer configured in accordance with an embodiment of the invention.

FIG. 1 illustrates a computer 100 configured in accordance with an embodiment of the invention. The computer 100 includes standard components, such as a central processing unit 110 connected to a set of input/output devices 112 via a bus 114. The input/output devices 112 may include a keyboard, mouse, display, printer, and the like. A network interface circuit 116 is also connected to the bus 114 to support connectivity to a network (not shown). Thus, the computer 100 may operate in a networked environment, such as a client-server environment as either a client machine or a server machine.

A memory 120 is also connected to the bus 114. The memory 120 stores executable instructions to implement operations of the invention. In one embodiment, the executable instructions are in the form of a Rapid Application Development (RAD) platform 122. The RAD platform 122 may include a set of existing objects 124, for example associated with a set of application templates. An object manager 126 facilitates access to the existing objects 124 and the creation of new objects 128. As discussed below, the new objects are associated with tabs. The object manager 126 allows various tabs to be combined to create applications 130. Notably the existing objects 124 and new objects 128 may be combined in various ways to produce a variety of applications. In other words, there is not a one-to-one correspondence between objects and an application. Rather, individual objects may be used to support various applications.

Figure 2:
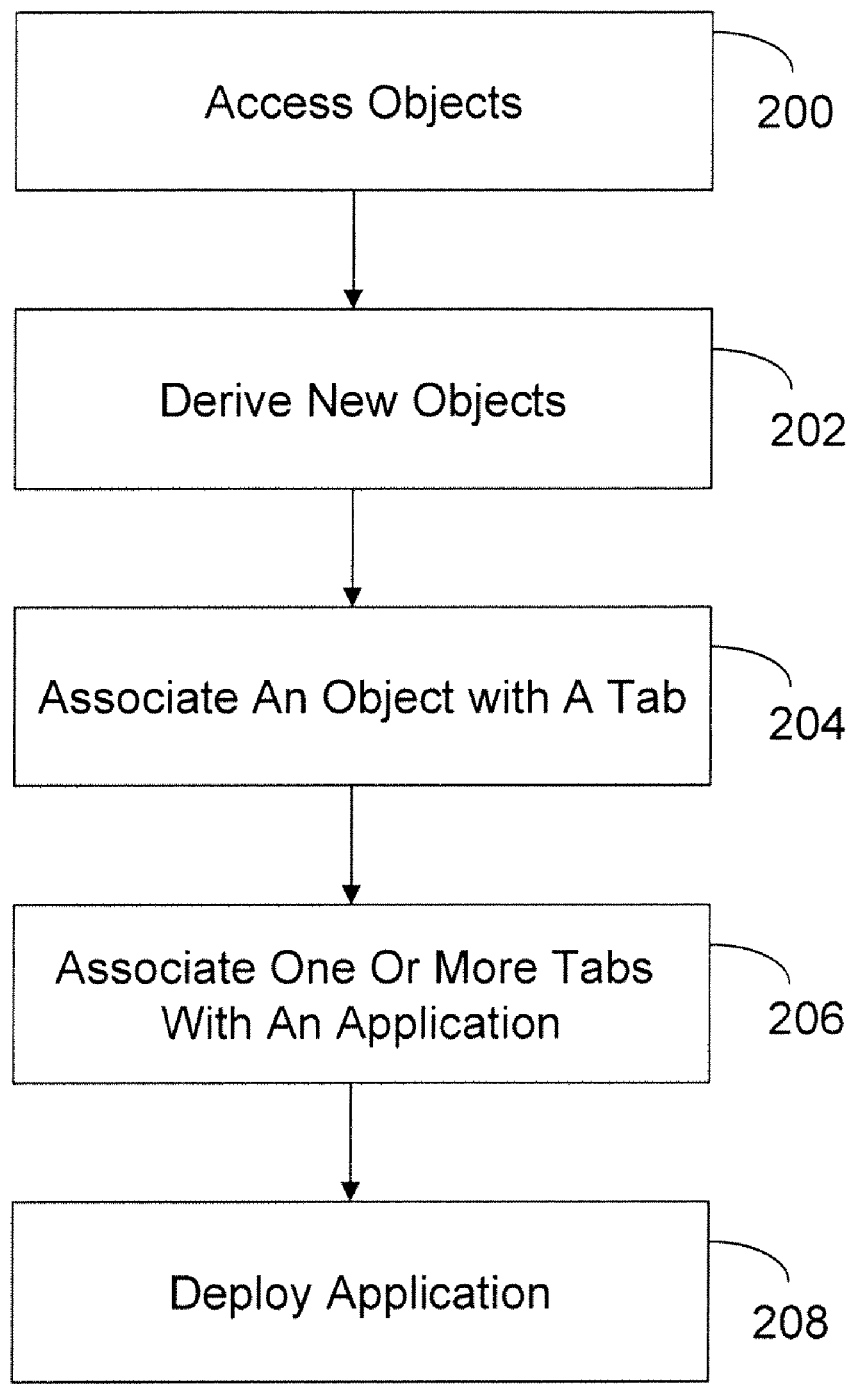
FIG. 2 illustrates processing operations associated with an embodiment of the invention.

FIG. 2 illustrates processing operations associated with an embodiment of the invention. Initially, objects are accessed 200. For example, the object manger 126 may access existing objects 124 or create new objects. New objects are then derived 202. For example, as discussed below, new object fields may be defined to create new objects 128. In addition, new objects may be created by selecting a subset of the fields associated with an existing object.

Next, an object is associated with a tab 204. The tab operates as a simple graphical metaphor to represent an object. One or more tabs are then associated with an application 206. As demonstrated below, various tabs may be selected to produce an application. The application may be revealed to a user as a set of tabs. Finally, the application is deployed 208. Once an application is constructed in the foregoing manner, conventional techniques may be used to deploy the application.

Figure 3:
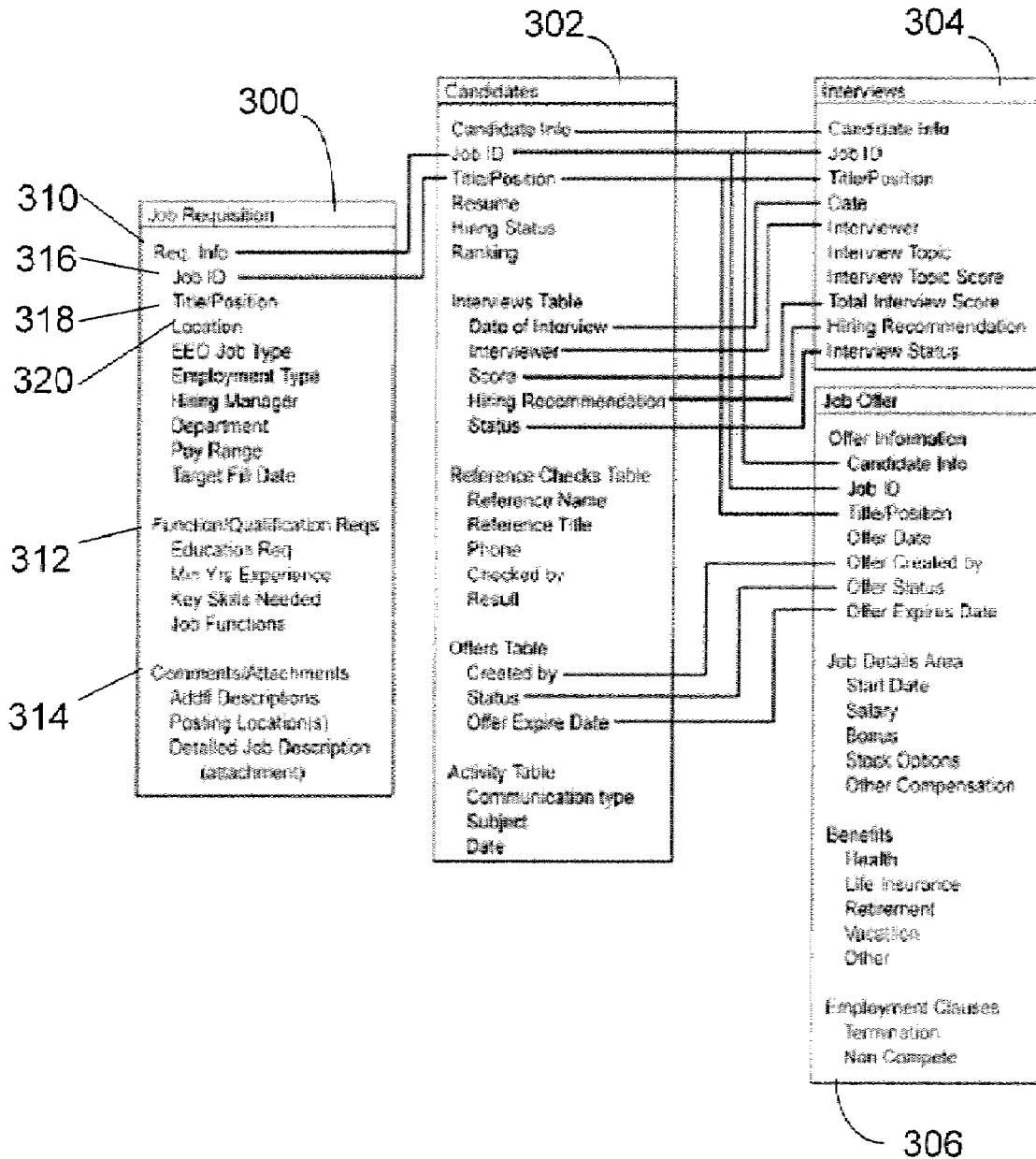
FIG. 3 illustrates objects processed in accordance with an embodiment of the invention.

FIG. 3 illustrates a set of objects that may be used to construct a recruiting management application. In this example, the recruiting management application is constructed from a job requisition object 300, a candidates object 302, an interviews object 304, and a job offer object 306. The job requisition object 300 includes a requisition information field 310, a function/qualification field 312 and a comments/attachments field 314. Each field may have subfields. For example, the requisition information field 310 includes a job ID subfield 316, a title/position subfield 318, a location subfield 320, and the like. As shown in FIG. 3, fields and subfields from various objects have counterparts in other objects.

Objects associated with the invention may be in the form of "enterprise objects". Enterprise objects define all the interfaces for interaction with an object (e.g., detail, edit, view, quick create, and search interfaces). Enterprise objects may also define the data modeling and database interaction from development interfaces automatically. Thus. one does not have to model the object first and then create the interface. Enterprise objects also include fields that contain data. Further, as discussed below, enterprise objects may be used in many applications. From within an interface, links to other enterprise objects or process applications may be added. These links may be static hyperlinks or can launch and prepopulate a record from another enterprise object process or application. The object manager 126 supports the linking of enterprise objects that belong to different applications. Role based access controls these links.

Figure 4:
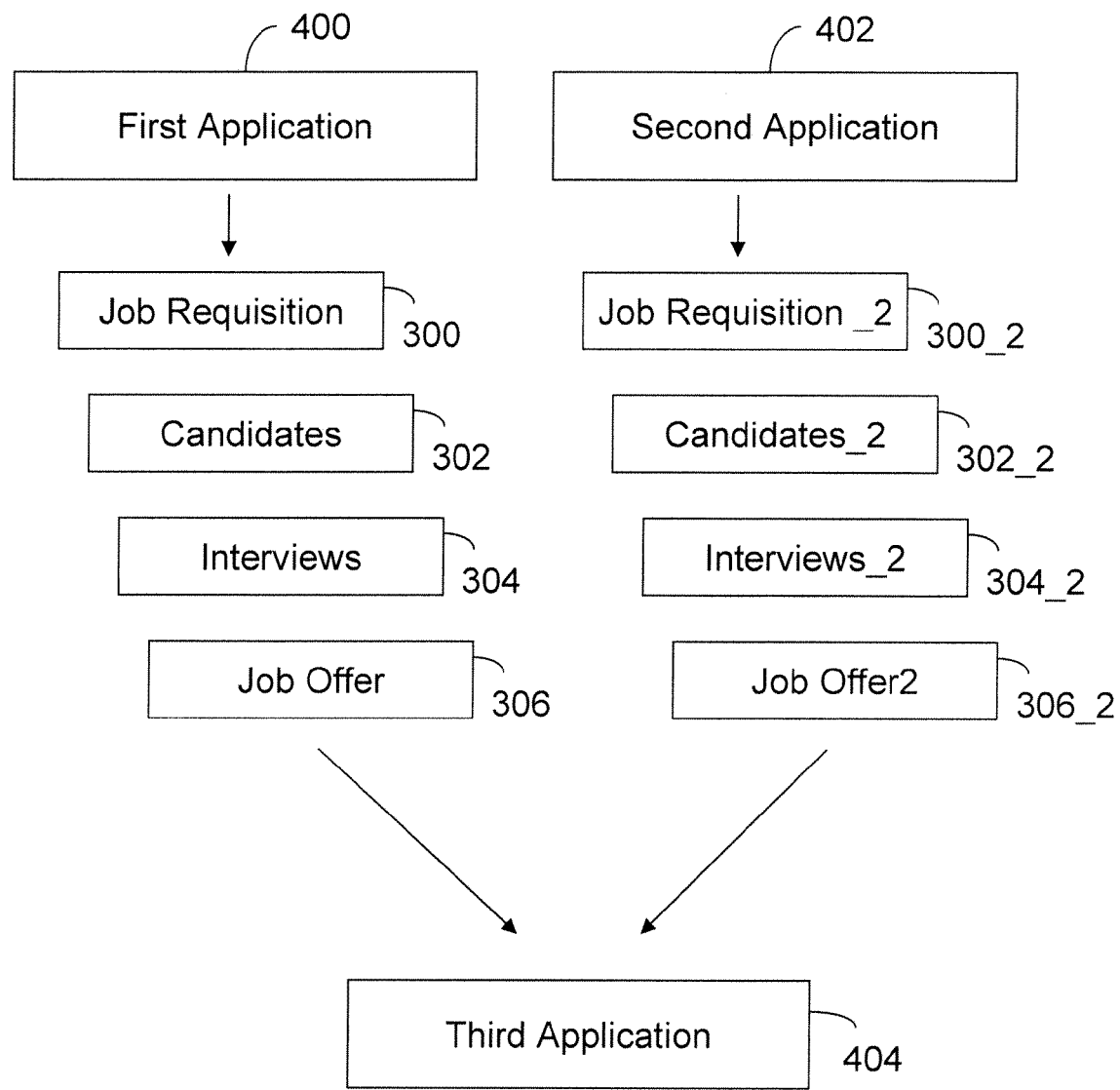
FIG. 4 illustrates the development of various applications with the objects of FIG. 3 and objects derived from the objects in FIG. 3.

FIG. 4 includes a simplified depiction of the objects 300-306 of FIG. 3. In this example, the objects 300-306 are associated with a first application 400. For example, objects 300-306 may be a set of pre-existing objects associated with an application template. The object manger 126 may be used to access the objects 300-306 and then modify them to produce a set of new objects 300_2 through 306_2. For example, a user may define a new object by specifying a subset of pre-existing fields and/or defining new object fields. The new objects 300_2 through 306_2 may then be selected to form a second application 402. Subsequently, objects may be selected from the original objects 300-306 and the new objects 300_2 through 306_2 to create a new application (e.g., a third application) 404. Observe then that the invention supports the creation of new objects and the utilization of those objects in a variety of applications.

Figure 5:
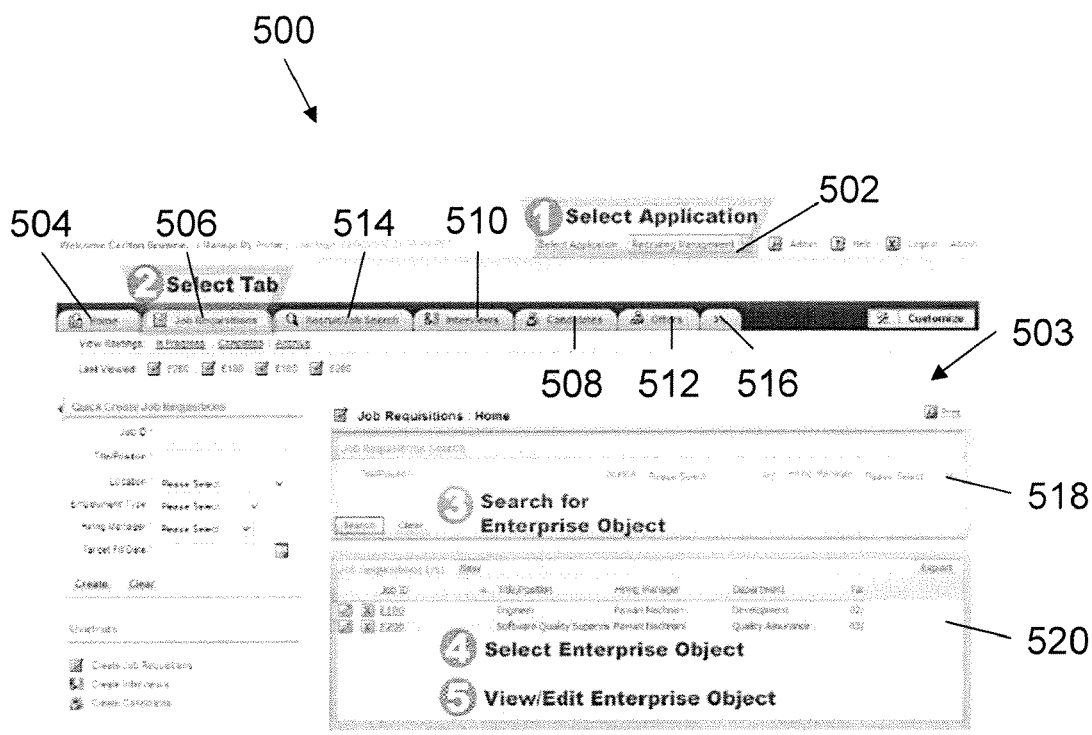
FIG. 5 illustrates the selection of an application and related tab in a GUI associated with an embodiment of the invention.

FIG. 5 illustrates a Graphical User Interface (GUI) 500 associated with an embodiment of the invention. The GUI 500 may be supported by the object manager 126. A pull-down window 502 allows a user to select an application. In this example, the previously discussed recruiting management application is selected. The recruiting management application has an associated home page 503, identified by tab 504. The home page 503 also has a set of tabs 506-514. Tab 506 corresponds to object 300 of FIG. 3, tab 508 corresponds to object 302, tab 510 corresponds to object 304, and tab 512 corresponds to object 306. Tab 514 invokes a search operation. As shown with tab 516, additional objects may be associated with an application, but not shown on the home page 503. Utilization of the search tab 514 may produce a search interface 518, which renders a list of searched objects 520 associated with an application. Selecting a tab in FIG. 5 moves a user from the home page 503 to a page providing details on the selected object. For example, selection of the job requisitions tab 506 results in the page 600 of FIG. 6.

FIG. 6 illustrates the fields 310, 312, and 314 associated with object 300 of FIG. 3. An expansion button 602 may be used to provide information on subfields, such as job ID 316, title/position 318 and location 320. Blocks 316, 318 and 320 form data input controls. The data input controls may be in any number of configurations, including text entry boxes, check boxes, buttons, linking controls, drop down menus, radio buttons, and the like. As discussed below, individual data input controls may have associated attribute properties, such as a hide attribute, a required attribute, an auto-load attribute, a data lookup attribute, a read-only attribute, a data format attribute, a default values attribute, a formulas attribute, a data visibility attribute, and an edit privilege attribute. When modifying an existing object, attribute properties may be automatically assigned to the new object. Individual attributes may then be altered by a user.

A user may alter the characteristics of the job requisition object by typing information into a subfield (e.g., 318) or by using a pull-down menu (e.g., 604) to specify further subfields associated with an object. Thus, in this example, existing objects may be modified to create new objects. The advantage here is that existing objects are leveraged to easily create new objects. A GUI such as that shown in FIG. 6 may also be used to initially express the definition of an object. In other words, a GUI of the type shown in FIG. 6 may be used to define new objects, not simply modify existing objects.

Figure 7:
FIGS. 7, 8, 9A and 9B illustrate GUIs to add object properties in accordance with an embodiment of the invention.
Figure 8:
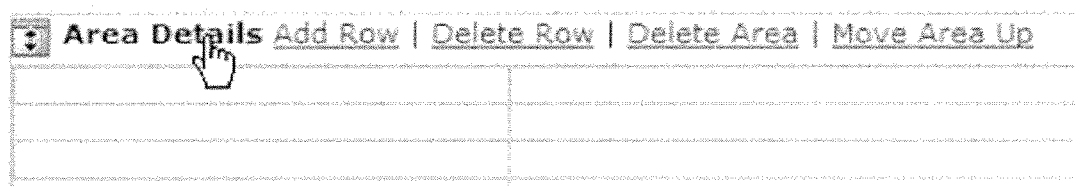
Figure 9A:
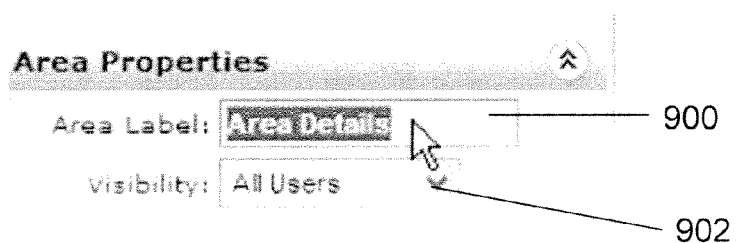
Figure 9B:

FIG. 7 illustrates a GUI 700 that may be used to add areas to an object. Various areas and tables may be defined using buttons 702 and 704. Similarly, as shown in FIG. 8, area details may be expressed, for example by adding a row, deleting a row, deleting an area and moving an area. As shown in FIG. 9A, an area label may be expressed in block 900 and a visibility attribute for the area may be expressed with block 902. An area holds one or more controls. The controls have attributes or properties and these attributes affect the behavior and depiction of the control within the associated object. FIG. 9B illustrates a GUI 910 to specify properties or attributes for a control specified in block 912. In this example, attributes that may be defined include, required, read only, keyword field, hidden, data type, etc.

Once an object is defined (e.g., by modifying an existing object or creating a new object), it may be associated with a tab. FIG. 10 illustrates a GUI 1000 to implement this operation. GUI 1000 may be used to edit a tab. A similar GUI can be called for a new tab by using button 1001. Whether editing or creating a tab, a name for the tab may be entered in block 1002. Attributes may also be assigned to the object using the tab GUI 1000. For example, the state of the corresponding object may be set with button 1004. The state may be an active state, as shown in FIG. 10, or a test state. A visibility state may be expressed with block 1006. The visibility state may be used to support role based access, as further discussed below. The type of object may be defined in block 1008. The version of the object may be expressed with block 1010. An image may be associated with the object using block 1012. In addition, a custom Uniform Resource Location (URL) for the object may be defined in block 1014.

Figure 11:
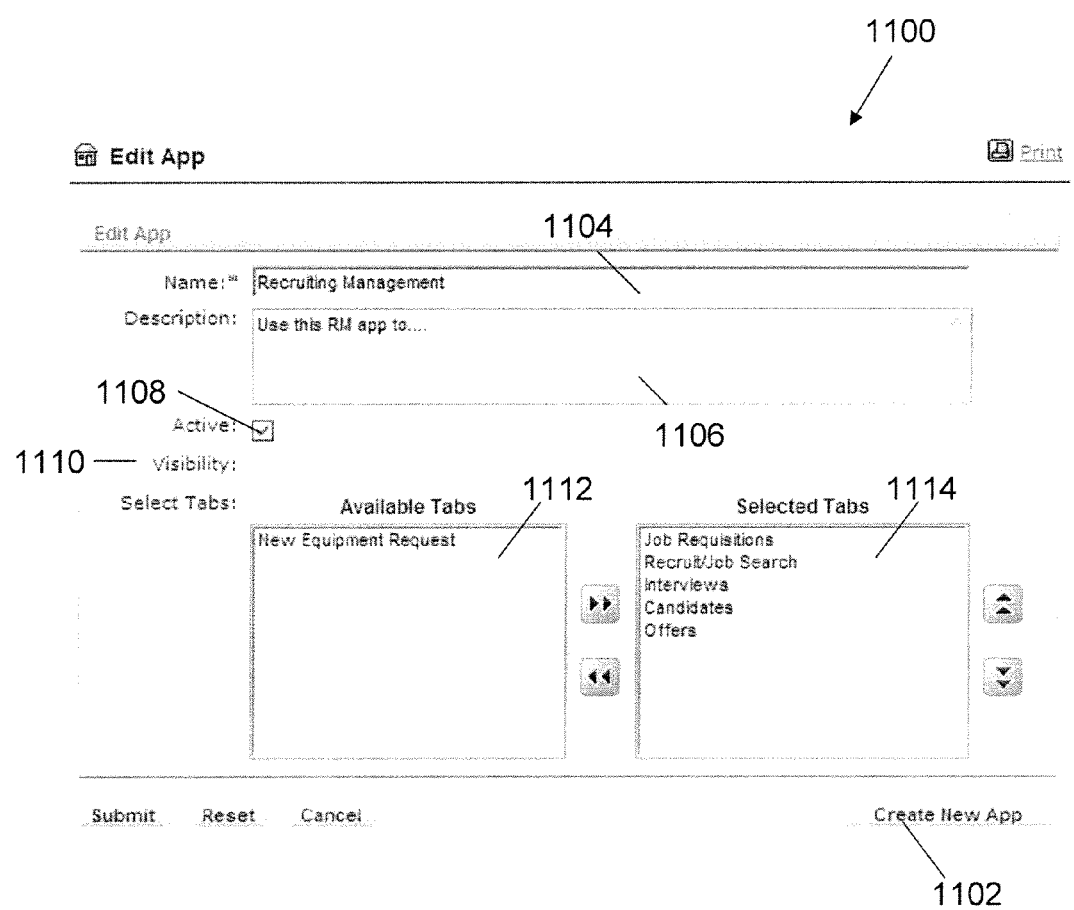
FIG. 11 illustrates a GUI that may be used to select tabs to create an application in accordance with an embodiment of the invention.

At this point, one or more tabs may be combined to form an application. GUI 1100 of FIG. 11 may be used to support this operation. The GUI 1100 may be used to edit an existing application; a similar GUI may be used to create a new application using button 1102. An application creation GUI, such as GUI 1100, may include a block 1104 to name the application. A description block 1106 may be used to provide a text description of the application. Button 1108 may be used to designate different application states, such as an active (i.e., deployed) state or a test state. Role based security may be specified with a visibility block 1110. An application is formed by selecting tabs from an available tabs block 1112. The selected tabs are then displayed in block 1114. Observe that the selected tabs shown in block 1114 correspond to the objects shown in FIG. 3.

Figure 12:
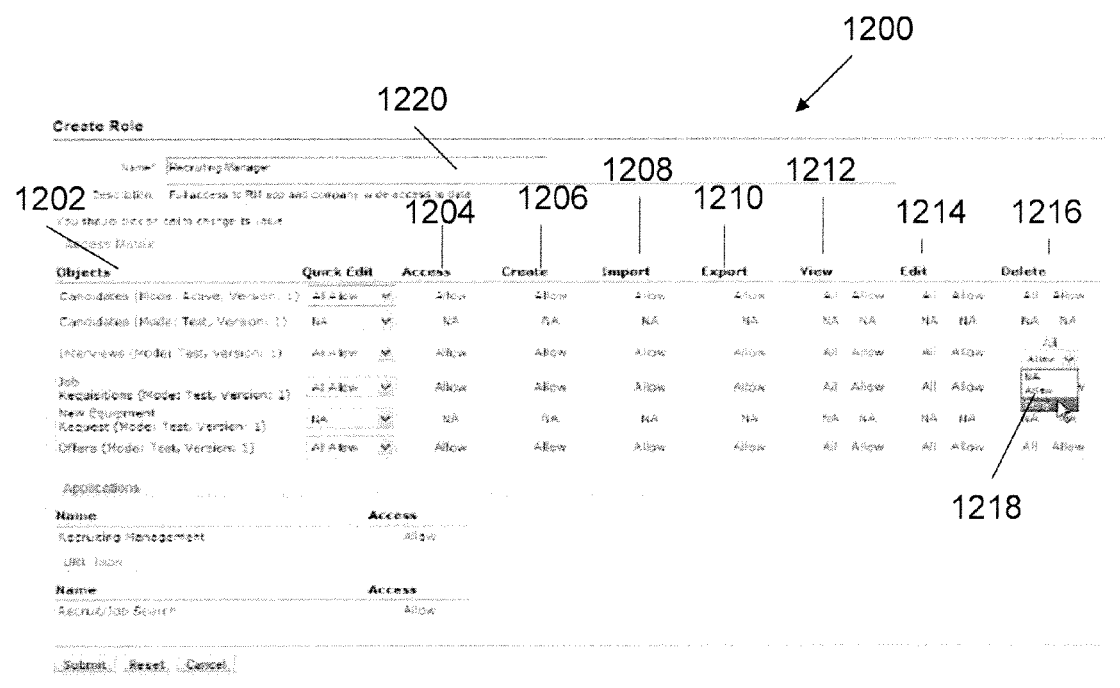

As previously mentioned, the invention supports role based security. FIG. 12 provides an example GUI 1200 to implement role based security. The GUI 1200 includes a column to list a set of objects or tabs. Subsequent columns may be used to specify controls to ascribe attributes to each object. In this example, attributes include access 1204, creation 1206, import 1210, view 1212, edit 1214, and delete 1216. Individual entries in the various columns may have associated pull-down windows, such as window 1218, which allows one to specify various rights, in this case allow, deny or not applicable (N/A). A name block 1220 may be used to express rights associated with an individual or a class of individuals (e.g., recruiting management). Role based security can be associated with individual fields and controls within the objects. In one embodiment, the association is created using an attribute property that is associated with the control.

Figure 13:
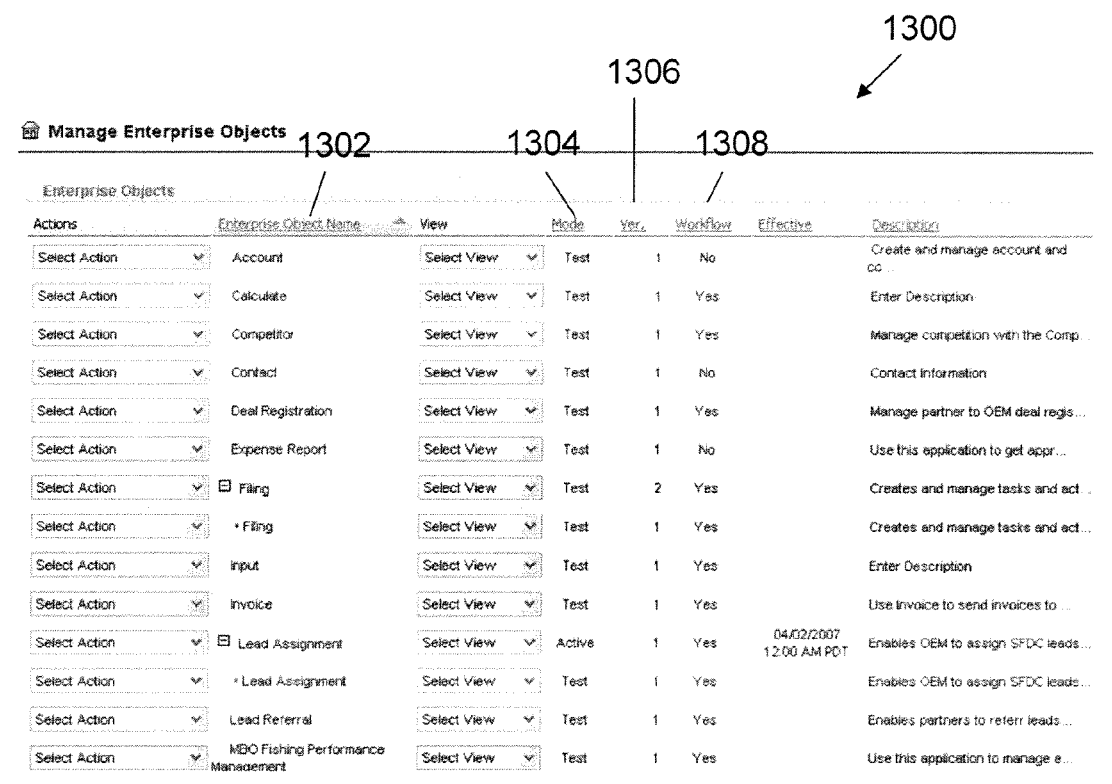

FIG. 13 illustrates a GUI 1300 that may be used for version control of objects utilized in accordance with an embodiment of the invention. The GUI 1300 includes a column 1302 that lists objects. Various traits associated with the object may be controlled from the GUI 1300. For example, the mode of the object (e.g., a test mode or an active mode) may be specified in column 1304. The version of the object may be specified in column 1306. An object with a first version number may be used in a first application, while a second version of the object is used in a second application. In one embodiment, the object manager 126 includes executable code to create a set of versioned objects, where each versioned object has a common set of base fields. For example, an initial object may have fields A, B, C, and D, while an object derived from the initial object utilizes original fields A and D and new fields E and F. The derived object will be handled as an object with fields A, B, C, D, E, and F so that there is backward compatibility with the initial object (i.e., a common set of base fields: A, B, C, D), but only the fields A, D, E and F are visible to the user. Finally, FIG. 13 illustrates that column 1308 may be used to express whether the object forms a part of a workflow.

Figure 14:
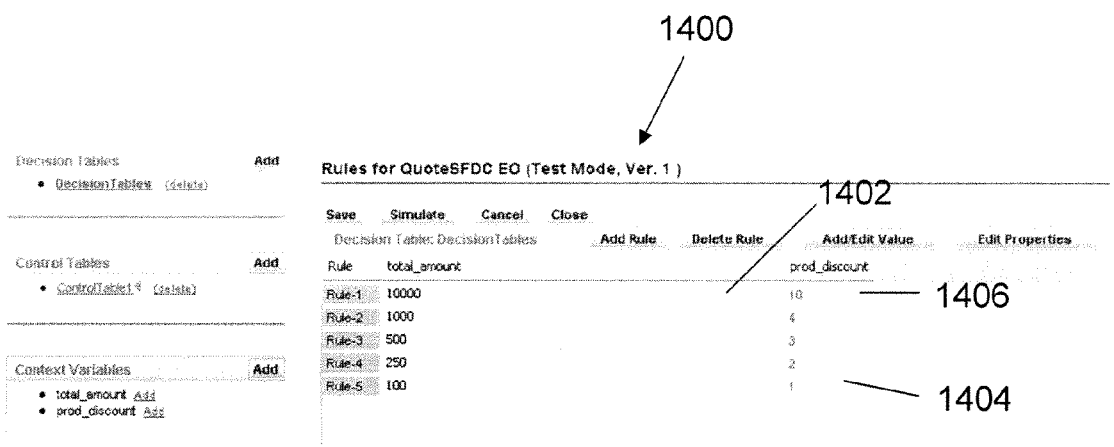
FIG. 14 illustrates the expression of rules in a decision table in accordance with an embodiment of the invention.

FIG. 14 illustrates an additional feature associated with an embodiment of the invention. The GUI 1400 supports the expression of rules for an object using a decision table. The GUI 1400 provides a table 1402 in which different rows express a different product discount. For example, row 1404 applies a product discount of 1 for a total transaction amount of 100 or more, while row 1406 applies a product discount of 10 for a total transaction amount of 10,000 or more. Thus, various rules may be expressed in a tabular form without writing executable instructions. Various commercially available products may then be used to transform the table based rules to a set of executable instructions to implement the logic of the table. The rule generator table of FIG. 14 therefore supports the rapid application development environment associated with the invention. In one embodiment, control tables provide rules to disambiguate the order in which decision tables are applied.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions that when executed by a computer causes the computer to:
 invoke a rapid application development graphical user interface to define fields associated with a set of objects;
 facilitate the creation of new objects derived from the set of objects using the rapid application development graphical user interface to select existing fields of the set of objects and define new object fields;
 associate tabs with the new objects; and
 select a set of tabs to create a new application.

2. The computer readable storage medium of claim 1 further comprising executable instructions to associate selected objects of the set of objects and the new objects with an additional application.

3. The computer readable storage medium of claim 1 wherein the rapid application development graphical user interface is a browser accessed home page displaying tabs.

4. The computer readable storage medium of claim 1 wherein the rapid application development graphical user interface includes data input controls.

5. The computer readable storage medium of claim 4 wherein the data input controls are selected from text entry boxes, check boxes, buttons, linking controls, drop down menus, and radio buttons.

6. The computer readable storage medium of claim 5 wherein the data input controls have attribute properties.

7. The computer readable storage medium of claim 6 wherein the attribute properties comprise at least three attribute properties selected from a hide attribute, a required attribute, an auto-load attribute, a data lookup attribute, a read-only attribute, a data format attribute, a default values attribute, a formulas attribute, a data visibility security attribute, and an edit privilege security attribute.

8. The computer readable storage medium of claim 6 wherein the attribute properties facilitate the depiction of fields within generated graphical user interfaces.

9. The computer readable storage medium of claim 6 wherein the attribute properties control role based access.

10. The computer readable storage medium of claim 1 further comprising executable instructions to associate an object with a version number.

11. The computer readable storage medium of claim 10 further comprising executable instructions to create a set of versioned objects, wherein each versioned object has a common set of base fields.

12. The computer readable storage medium of claim 10 further comprising executable instructions to associate a designated object with one version number with a first application and the designated object with a second version number with a different application.

13. The computer readable storage medium of claim 1 further comprising executable instructions to associate an object with a state selected from a test state and an active state.

14. The computer readable storage medium of claim 1 further comprising executable instructions to specify rules associated with an object.

15. The computer readable storage medium of claim 14 wherein the rules are expressed within decision tables.

16. A computer readable storage medium, comprising executable instructions that when executed by a computer causes the computer to:
  invoke a rapid application development graphical user interface to define fields associated with a set of objects;
  facilitate the creation of new objects that define fields using the rapid application development graphical user interface to define a set of fields based on a provided set of data input controls;
  associate tabs with the new objects; and
  select a set of tabs to create a new application.

17. The computer readable storage medium of claim 16 further comprising executable instructions to associate selected objects of the set of objects and the new objects with an additional application.

18. The computer readable storage medium of claim 16 wherein the rapid application development graphical user interface is a browser accessed home page displaying tabs.

19. The computer readable storage medium of claim 16 wherein the data input controls have attribute properties.

20. The computer readable storage medium of claim 19 wherein the attribute properties control role based access.

* * * * *